United States Patent Office 3,716,551
Patented Feb. 13, 1973

3,716,551
DEUTERATED L-AMINO ACID MIXTURE
Irving Putter, Martinsville, N.J., assignor to
Merck & Co., Inc., Rahway, N.J.
No Drawing. Filed July 17, 1969, Ser. No. 842,715
Int. Cl. C07d 49/36
U.S. Cl. 260—309     8 Claims

ABSTRACT OF THE DISCLOSURE

A mixture of naturally occurring L-amino acids in deuterated form and a method for the preparation of such a mixture which consists in treating deuterated algae with acid to afford a protein residue which is then hydrolyzed, concentrated, filtered, adsorbed upon a suitable ion exchange resin and recovered by conventional means.

---

This invention relates to a mixture of the naturally occurring L-amino acids in deuterated form and to a method for the preparation of such a mixture.

It is known that some of the lower plants, such as algae, contain a fairly high proportion of protein which constitute a good and inexpensive source for naturally occurring L-amino acids. However, algae has not been used on a large scale to prepare amino acids because of the difficulties of breaking down the proteins contained therein and, also, because of the presence of other substances such as chlorophyll and sugar which have a tendency to combine with amino acids to form insoluble humin or other polymeric by-products and which would thereby decrease substantially the yield of amino acid products.

The breakdown of algae to liberate its proteins can be carried out by a chemical or physical process. The chemical process is termed hydrolysis and is carried out with an acid as, for example, with mineral acid such as hydrochloric acid and the like or with a suitable base as, for example, with an alkali metal hydroxide such as sodium hydroxide, potassium hydroxide or barium hydroxide and the like or with a suitable proteolytic enzyme. The hydrolysis of algae is usually carried out directly with a solution of acid as, for example, with a 1 N solution of hydrochloric acid to remove the sugars, followed by hydrolysis with a strong solution of an acid as, for example, with a 6 N solution of a mineral acid to break down the protein to the L-amino acids; however, such acid hydrolysis usually results in the formation of a certain amount of impurities with selective loss of the more labile L-amino acids thus resulting in a correspondingly lower and impure yield of L-amino acid.

Hydrolysis with alkali is possible, but is seldom used for isolating L-amino acids from algae because the treatment leads to extensive racemization of most of the L-amino acids.

Finally, hydrolysis with enzymes, which has the distinct advantage of being less destructive to sensitive L-amino acids, is slow and far from being complete so that yields are also very low.

A small amount of L-amino acids can also be derived from algae by physically breaking open or rupturing the cell to liberate the protein, by grinding the algae with alumina or glass powder, by alternately freezing and thawing the algae or by submitting the algae to intensely high pressure to effect a rupture of the cell walls. These physical means are disadvantageous in that only a small amount of algae can be processed and the product obtained is impure.

It is an object of the present invention to prepare deuterated naturally occurring L-amino acids which have utility in nuclear magnetic resonance and protein structure studies and in chemical and biochemical investigations.

In accordance with the present invention, there is now provided a mixture containing substantially all of the L-amino acids which are present in algae in their deuterated form. More specifically, the product of the present invention is a mixture of substantially all of the L-amino acids originally present in algae, as, for example, lysine, histidine, arginine, tryptophan, aspartic acid, threonine, serine, glutamic acid, proline, glycine, alanine, valine, methionine, isoleucine, leucine, tyrosine, phenylalanine and cystine, which amino acids are all substantially deuterated.

In accordance with the present invention there is also provided a process for isolating a mixture containing substantially all of the L-amino acids present in lyophilized deuterated algae. The process comprises heating lyophilized deuterated algae with a suitable acid such as trihalo substituted lower alkanoic acid, for example, a trihaloacetic acid such as trifluoroacetic acid or trichloroacetic acid at a concentration of from 1 to about 30% at a temperature of from about 30° C. to 80° C. or with dilute mineral acid as, for example, with a 0.1 N to 2.0 N solution of hydrochloric acid or sulfuric acid and the like at a temperature in the range of from about 50° C. to 90° C. for a period of from about 15 minutes to 24 hours thereby causing the proteins and chlorophyll to separate from the cells in an insoluble form while solubilizing certain undesirable components of the algae such as sugars. The insoluble residue obtained by centrifugation contains the liberated proteins, chlorophyll and lipids. By subjecting this residue to a few washes with an ethanol-ethyl ether mixture whereby the chlorophyll and lipids are solubilized, the residue containing the liberated protein is obtained.

The L-amino acids thus obtained are then liberated from the protein residue by hydrolysis with an acid as, for example, with a mineral acid such as hydrochloric acid. In the hydrolysis step, humin and insoluble polymeric material are precipitated and the acid is removed from the filtrate to provide a further concentrate of the amino acids. Elimination of the excess acid is carried out by concentration to a syrup, vacuum drying in the presence of a suitable base as, for example sodium hydroxide and dissolving the residue in water and filtering off any residue of humin and insoluble polymers.

The resulting filtrate is then treated with an ion-exchange resin such as a sulfonic acid resin whereby substantially all of the deuterated L-amino acids are adsorbed and the non-amino acid components and any remaining acid are effectively eliminated. The adsorbed L-amino acids are recovered by elution as, for example, by treatment with a suitably concentrated solution of ammonium hydroxide such as a 6 N concentration of the eluate, filtration of the concentrate dissolved in water and decolorization with charcoal followed by filtration, concentration and lyophilization to afford a mixture of the L-amino acids in deuterated form.

The process of the present invention provides an exceptionally high yield of L-amino acids, the yield being approximately 70% of the estimated initial amino acid content of the algae.

The process of the present invention can be illustrated schematically by reference to the following flowsheet:

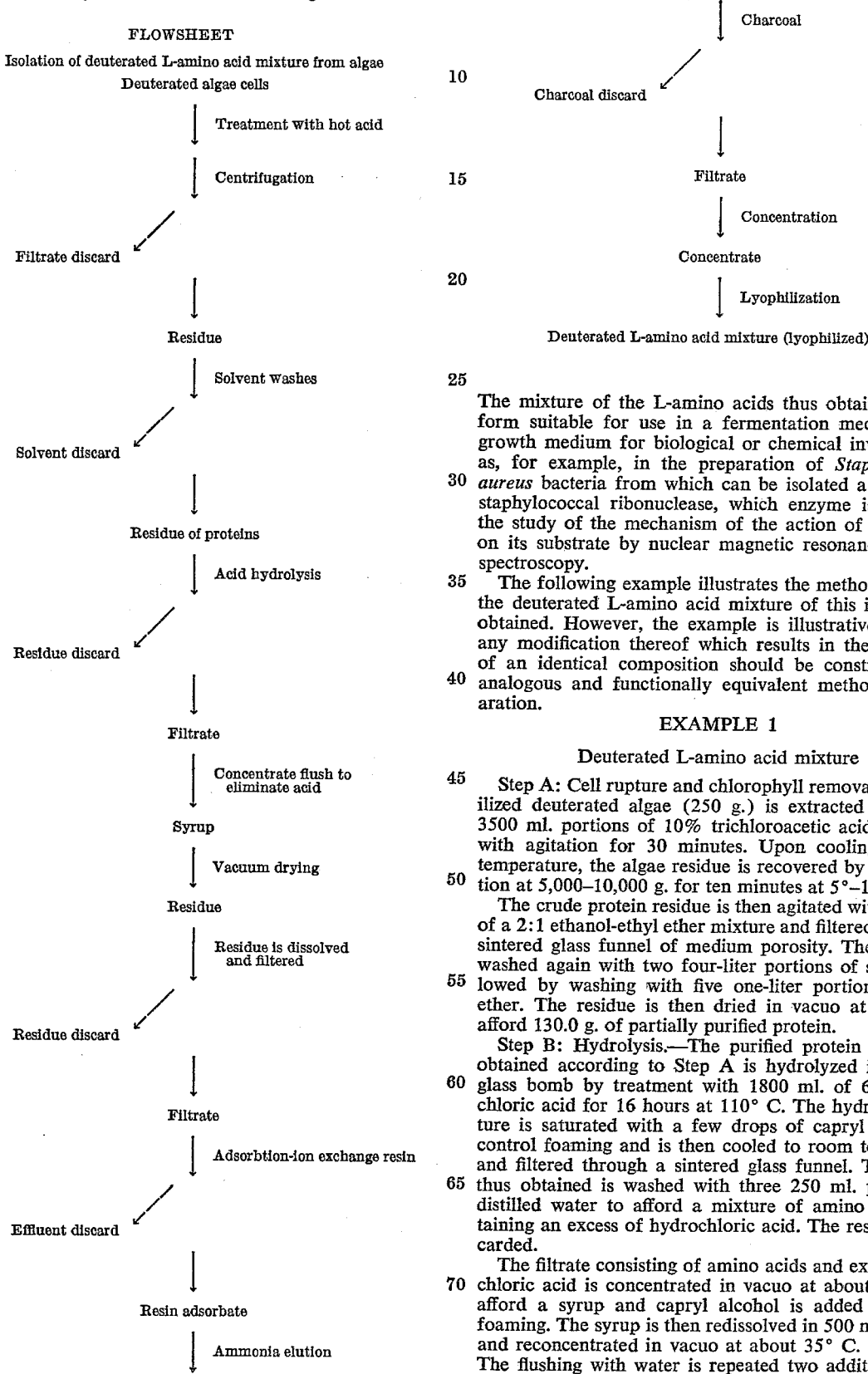

The mixture of the L-amino acids thus obtained is in a form suitable for use in a fermentation medium or as growth medium for biological or chemical investigations as, for example, in the preparation of *Staphylococcus aureus* bacteria from which can be isolated a deuterated staphylococcal ribonuclease, which enzyme is useful in the study of the mechanism of the action of an enzyme on its substrate by nuclear magnetic resonance (NMR) spectroscopy.

The following example illustrates the method by which the deuterated L-amino acid mixture of this invention is obtained. However, the example is illustrative only and any modification thereof which results in the formation of an identical composition should be construed as an analogous and functionally equivalent method of preparation.

EXAMPLE 1

Deuterated L-amino acid mixture

Step A: Cell rupture and chlorophyll removal.—Lyophilized deuterated algae (250 g.) is extracted with three 3500 ml. portions of 10% trichloroacetic acid at 70° C. with agitation for 30 minutes. Upon cooling to room temperature, the algae residue is recovered by centrifugation at 5,000–10,000 g. for ten minutes at 5°–10° C.

The crude protein residue is then agitated with 4.0 liters of a 2:1 ethanol-ethyl ether mixture and filtered on a large sintered glass funnel of medium porosity. The residue is washed again with two four-liter portions of solvent followed by washing with five one-liter portions of ethyl ether. The residue is then dried in vacuo at 30° C. to afford 130.0 g. of partially purified protein.

Step B: Hydrolysis.—The purified protein (126.5 g.) obtained according to Step A is hydrolyzed in a sealed glass bomb by treatment with 1800 ml. of 6 N hydrochloric acid for 16 hours at 110° C. The hydrolysis mixture is saturated with a few drops of capryl alcohol to control foaming and is then cooled to room temperature and filtered through a sintered glass funnel. The residue thus obtained is washed with three 250 ml. portions of distilled water to afford a mixture of amino acids containing an excess of hydrochloric acid. The residue is discarded.

The filtrate consisting of amino acids and excess hydrochloric acid is concentrated in vacuo at about 35° C. to afford a syrup and capryl alcohol is added to control foaming. The syrup is then redissolved in 500 ml. of water and reconcentrated in vacuo at about 35° C. to a syrup. The flushing with water is repeated two additional times in order to remove most of the free hydrochloric acid.

The syrup is then dried in a vacuum oven at about 50° C. containing a tray of sodium hydroxide pellets for 16 hours in order to remove the last trace of free hydrochloric acid. It is critical to remove the last traces of hydrochloric acid in order to obtain good adsorbtion on the resin column. The syrup is dissolved in 2.0 liters of water and filtered through a sintered glass funnel to afford a filtrate comprising the amino acids and their hydrochloride salts and soluble impurities. The volume is adjusted to 3.0 liters.

Step C: Resin adsorbtion.—An 8.5 cm. diameter/80 cm. column (4.0 liters) is filled with a sulfonic acid ion exchange resin 8% cross linked (Dowex 50–X8 resin) and converted to the hydrogen cycle. The resin is pretreated with 20 liters of 1.5% ammonium hydroxide solution followed by the addition of 20 liters of water, whereafter 20 liters of 10% hydrochloric acid solution is added to the mixture. The column is washed with distilled water at a rate of 175 ml. per minute until free of chloride ion. The filtered hydrolysis solution containing amino acids and their hydrochloride salts and soluble impurities is passed through the column (60 ml. per minute) and washed with water until a volume of 12 liters is collected. The column is then eluted with 6 N ammonium hydroxide solution. A void of 3500 ml. is discarded and ten liters of eluate are collected. In the mixture thus obtained 90% of the amino acids are present in the first two liters of eluate. The entire collection of eluates is concentrated in vacuo at about 35° C. to 500 ml. and lyophilized to yield 81.3 gm. of deuterated L-amino acids.

Step D: Deuterated L-amino acid mixture.—The mixture of deuterated L-amino acids obtained according to Step C is dissolved in 1.5 liters of distilled water and decolorized with an equal weight of decolorizing carbon and stirred for one-half hour at room temperature. The slurry is filtered over a thin layer of diatomaceous earth and washed with two 500 ml. portions of water. The filtrate and washes are then concentrated in vacuo to 500 ml. and lyophilized to afford 72 g. of a white purified mixture of deuterated L-amino acids.

The following table indicates the constitution of the L-amino acid composition and also, the yields obtained via the reaction of non-deuterated algae and deuterated algae in a pilot run following the above-described procedure:

| Deuterated L-amino acid | Non-deuterated algae in percent | Deuterated algae pilot run in percent | Deuterated algae large run in percent (Example 1) |
| --- | --- | --- | --- |
| Protein content | 25 | 40 | 40 |
| Lysine | 6.86 | 5.30 | 4.98 |
| Histidine | 1.87 | 1.31 | 1.46 |
| Ammonia | 1.05 | 1.19 | 1.51 |
| Arginine | 3.32 | 3.92 | 3.73 |
| Tryptophan | 1.21 | 1.09 | 0.87 |
| Aspartic acid | 8.20 | 9.78 | 9.75 |
| Threonine | 4.80 | 4.45 | 5.12 |
| Serine | 5.35 | 4.60 | 4.40 |
| Glutamic acid | 11.65 | 9.98 | 9.99 |
| Proline | 4.57 | 5.60 | 5.08 |
| Glycine | 5.72 | 5.84 | 5.82 |
| Alanine | 8.74 | 8.07 | 8.45 |
| Isoleucine | 4.33 | 3.78 | 4.17 |
| Leucine | 9.20 | 9.10 | 9.97 |
| Tyrosine | 1.81 | 1.35 | 1.35 |
| Phenylalanine | 2.81 | 3.50 | 3.98 |
| ½ cystine | trace | trace | trace |
| Moisture | 7.11 | 15.00 | 12.15 |
| Purity | 96 | 101 | 100 |
| Nitrogen | 12.88 | 12.92 | 13.48 |
| Yield per 100 gm. of algae cells | 17.6 | 29.2 | 29 |
| Color | (1) | (1) | (1) |

[1] White.

It will be apparent from the foregoing that the novel deuterated L-amino acid mixture of this invention constitutes a valuable contribution to the art and, also, one skilled in the art will appreciate that the process disclosed in the above example is merely illustrative and is capable of wide variation and modification without departing from the spirit of this invention.

What is claimed is:

1. A mixture of all the deuterated L-amino acids originally present in deuterated algae in substantially pure form.

2. A method for the preparation of a mixture of substantially all the deuterated L-amino acids originally present in deuterated algae in substantially pure form which comprises treating deuterated algae with an acid selected from (a) a trihaloacetic acid at a concentration from 1 to about 30 and at a temperature from about 30° C. to 80° C. or (b) a 0.1 N to 2.0 N mineral acid at a temperature from about 50° C. to 90° C. for a period from about 15 minutes to 24 hours to afford an insoluble residue which is washed with a solvent to afford a protein residue which is hydrolyzed, subjected to filtration, concentrated, the concentrate treated with an ion-exchange resin to adsorb the L-amino acid mixture in deuterated form, followed by elution of the said mixture in substantially pure form by conventional means.

3. The method of claim 2 wherein the deuterated algae is treated with a trihalo substituted alkanoic acid or a dilute mineral acid.

4. The method of claim 2 wherein the adsorbed L-amino acid mixture is treated with ammonium hydroxide, and the resulting eluate is filtered, concentrated and lyophilized to afford the desired product.

5. The method according to claim 2 wherein the protein residue is subjected to acid hydrolysis, filtered, concentrated and separated from any insoluble residue to afford a solution of L-amino acids in deuterated form, which solution then is adsorbed on a sulfonic acid ion-exchange resin and isolated by elution.

6. The method of claim 5 wherein the deuterated algae is in a lyophilized form.

7. The method according to claim 2 wherein the acid employed is trichloroacetic acid.

8. A method for the preparation of a mixture of substantially all the deuterated L-amino acids originally present in deuterated algae in substantially pure form which comprises treating deuterated algae with trichloroacetic acid at a concentration from 1 to about 30% and at a temperature from about 30° C. to 80° C. to afford an insoluble residue which is washed with a solvent mixture of ethanol and ethyl ether to afford a protein residue which is hydrolyzed with mineral acid, subjected to filtration, concentrated, the concentrate treated with a sulfonic acid ion-exchange resin to adsorb the L-amino acid mixture is deuterated form followed by elution with a concentrated solution of ammonium hydroxide to yield the said mixture of deuterated L-amino acids in substantially purse form.

References Cited

Tamiya et al.: J. Biochem. 51(1), 78–88 (1962).
Blake et al.: Chem. Absts. 55:16680i.
Flaumenhaft et al.: Science 132, 892–4 (1960).
Blomquist et al.: J. Org. Chem. 31(12), 4121–7 (1966).

HENRY R. JILES, Primary Examiner
G. T. TODD, Assistant Examiner

U.S. Cl. X.R.

195—100; 260—326.14 T, 326.3, 518 R, 519, 529, 534 R, 534 C, 534 E, 534 G, 534 L, 534 M, 534 S